United States Patent
Lin et al.

(10) Patent No.: US 10,908,332 B2
(45) Date of Patent: Feb. 2, 2021

(54) COLOR FILM SUBSTRATE, METHOD FOR MANUFACTURING THE SAME, AND DISPLAY DEVICE

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Haiyun Lin, Beijing (CN); Qinghui Zhao, Beijing (CN); Dongzhao Li, Beijing (CN); Nannan Du, Beijing (CN); Tingze Dong, Beijing (CN); Jingpeng Li, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 176 days.

(21) Appl. No.: 16/099,347

(22) PCT Filed: May 9, 2018

(86) PCT No.: PCT/CN2018/086133
§ 371 (c)(1),
(2) Date: Nov. 6, 2018

(87) PCT Pub. No.: WO2018/210168
PCT Pub. Date: Nov. 22, 2018

(65) Prior Publication Data
US 2019/0353833 A1    Nov. 21, 2019

(30) Foreign Application Priority Data
May 17, 2017   (CN) .......................... 2017 1 0351019

(51) Int. Cl.
G02B 27/00 (2006.01)
G02B 5/20 (2006.01)
G02F 1/1335 (2006.01)

(52) U.S. Cl.
CPC ....... G02B 5/201 (2013.01); G02F 1/133512 (2013.01); G02F 1/133516 (2013.01)

(58) Field of Classification Search
CPC . G02B 1/14; G02B 5/20; G02B 5/205; G02B 5/22; G02B 5/223; G02F 1/133509;
(Continued)

(56) References Cited

U.S. PATENT DOCUMENTS 10,481,426 B2 *  11/2019  Yin .................. G02F 1/133516
2005/0221205 A1   10/2005  Kim

FOREIGN PATENT DOCUMENTS

CN    102799017    11/2012
CN    105867008    8/2016
(Continued)

OTHER PUBLICATIONS

International Search Report and Written Opinion of the International Searching Authority corresponding to International Patent Application No. PCT/CN2018/086133, dated Jul. 17, 2018. (17 pages with English translation).
(Continued)

*Primary Examiner* — Arnel C Lavarias
(74) *Attorney, Agent, or Firm* — Myers Bigel, P.A.

(57) ABSTRACT

A color film substrate, a method for manufacturing the same, and a display device are provided, and relate to the field of display technology. The method includes providing a basal substrate, a surface of the basal substrate including a plurality of separated color filter regions and a plurality of interval regions, each interval region being located between two adjacent color filter regions, forming a color filter
(Continued)

pattern in each color filter region, and forming a transparent filling pattern in each interval region, and performing a blackening process to the filling pattern so that the filling pattern is converted into an opaque pattern.

5 Claims, 7 Drawing Sheets

(58) Field of Classification Search
CPC ......... G02F 1/133512; G02F 1/133514; G02F 1/133516; G02F 2001/133519; G02F 1/136209
USPC ........ 359/601.609, 613, 614, 885, 888, 892; 349/122, 138, 155, 156
See application file for complete search history.

(56) References Cited

FOREIGN PATENT DOCUMENTS

| | | |
|---|---|---|
| CN | 105867010 | 8/2016 |
| CN | 106646990 | 5/2017 |
| CN | 106940490 | 7/2017 |

OTHER PUBLICATIONS

Chinese Office Action corresponding to Chinese Patent Application No. 201710351019.4, dated Mar. 28, 2019. (23 pages with English translation).

* cited by examiner

COLOR FILM SUBSTRATE, METHOD FOR MANUFACTURING THE SAME, AND DISPLAY DEVICE

CROSS-REFERENCE TO RELATED APPLICATIONS

The present application is a 35 U.S.C. 371 national stage application of PCT International Application No. PCT/CN2018/086133, filed on May 9, 2018, which claims the benefit of Chinese patent application No. 201710351019.4, filed on May 17, 2017, the contents of which are incorporated herein by reference in their entireties.

TECHNICAL FIELD

The present disclosure relates to the field of display technology, and in particular, to a color film substrate, a method for manufacturing the same, and a display device.

BACKGROUND

The color filter (CF) substrate is one of the important components in the display panel. Light transmitted from the liquid crystal layer or white light emitted from the organic electroluminescent device passes through the color filters of red, green, blue, and the like arranged in an array on the color film substrate, thereby emitting light of various colors such as red, green, and blue light and achieving color display of the display panel. In order to prevent crosstalk of light transmitted from adjacent color filters, a black matrix (BM) is usually disposed on the color film substrate. A plurality of separated hollow regions are formed on the black matrix, and color filters are coated in the hollow regions of the black matrix to avoid crosstalk.

However, since the adhesion between the BM material and the basal substrate of the color film substrate is weak, the problem of peeling off easily occurs, which affects the normal display of the display panel. For example, in the liquid crystal display panel, after the BM material is peeled off, bubble defects in the liquid crystal cell may occur.

SUMMARY

An embodiment of the present disclosure provides a method for manufacturing a color film substrate. The method includes: providing a basal substrate; a surface of the basal substrate including a plurality of separated color filter regions and a plurality of interval regions, each interval region being located between two adjacent color filter regions; forming a color filter pattern in each color filter region and forming a transparent filling pattern in each interval region; and performing a blackening process to the filling pattern so that the filling pattern is converted into an opaque pattern.

In some embodiments, the step of performing a blackening process to the filling pattern so that the filling pattern is converted into an opaque pattern includes: applying a mask and performing any one of laser burning, ultraviolet exposure, carbonization treatment and ion doping to the filling pattern to make the filling pattern opaque; a transparent region of the mask exposes the filling pattern, and an opaque region of the mask shields the color filter pattern.

In some embodiments, the step of forming the color filter pattern in each color filter region and forming the transparent filling pattern in each interval region, and the step of performing the blackening process to the filling pattern so that the filling pattern is converted into the opaque pattern include: forming a color filter pattern in each color filter region, forming a transparent filling pattern having a predetermined thickness in each interval region; the filling pattern being composed of a material of the color filter pattern or a transparent filling material; and performing a blackening process to the filling pattern so that the filling pattern is converted into an opaque pattern.

In some embodiments, the filling pattern includes a first sub-filling pattern and a second sub-filling pattern disposed in a stack. The step of forming the color filter pattern in each color filter region and forming the transparent filling pattern in each interval region, and the step of performing the blackening process to the filling pattern so that the filling pattern is converted into the opaque pattern include: forming a color filter pattern in each color filter region, forming a first sub-filling pattern having a predetermined thickness in each interval region; the first sub-filling pattern being composed of a material of the color filter pattern or a transparent filling material; forming a protective layer covering the color filter pattern and the first sub-filling pattern; a portion of the protective layer covering the first sub-filling pattern being the second sub-filling pattern; the protective layer being composed of a transparent filling material; and performing a blackening process to the second sub-filling pattern so that the filling pattern is converted into an opaque pattern.

In some embodiments, the filling pattern includes a first sub-filling pattern, a second sub-filling pattern and a spacer pattern disposed in a stack. The step of forming the color filter pattern in each color filter region and forming the transparent filling pattern in each interval region, and the step of performing the blackening process to the filling pattern so that the filling pattern is converted into the opaque pattern include: forming a color filter pattern in each color filter region, forming a first sub-filling pattern having a predetermined thickness in each interval region; the first sub-filling pattern being composed of a material of the color filter pattern or a transparent filling material; forming a protective layer covering the color filter pattern and the first sub-filling pattern; a portion of the protective layer covering the first sub-filling pattern being the second sub-filling pattern; the protective layer being composed of a transparent filling material; forming a spacer pattern on the second sub-filling pattern; the spacer pattern being composed of a transparent filling material; and performing a blackening process to the spacer pattern so that the filling pattern is converted into an opaque pattern.

In some embodiments, the step of forming the color filter pattern in each color filter region and forming the transparent filling pattern in each interval region, and the step of performing the blackening process to the filling pattern so that the filling pattern is converted into the opaque pattern include: forming a color filter pattern in each color filter region; forming a protective layer covering the color filter pattern and the interval region; a portion of the protective layer covering the interval region being the filling pattern; the protective layer being composed of a transparent filling material; and performing a blackening process to the filling pattern so that the filling pattern is converted into an opaque pattern.

In some embodiments, the filling pattern includes a first sub-filling pattern and a spacer pattern disposed in a stack. The step of forming the color filter pattern in each color filter region and forming the transparent filling pattern in each interval region, and the step of performing the blackening process to the filling pattern so that the filling pattern is converted into the opaque pattern include: forming a color filter pattern in each color filter region; forming a protective layer covering the color filter pattern and the interval region; a portion of the protective layer covering the interval region being the first sub-filling pattern; forming a spacer pattern on the first sub-filling pattern; the spacer pattern being composed of a transparent filling material; and performing a blackening process to the spacer pattern so that the filling pattern is converted into an opaque pattern.

An embodiment of the present disclosure provides a color film substrate. The color film substrate includes: a basal substrate; a surface of the basal substrate including a plurality of separated color filter regions and a plurality of interval regions, each interval region being located between two adjacent color filter regions; a color filter pattern formed in each color filter region and a transparent filling pattern formed in each interval region; the filling pattern being composed of a material of the color filter pattern and/or a transparent filling material; the filling pattern is subjected to a blackening process so that the filling pattern is converted into an opaque pattern.

In some embodiments, the filling pattern includes a first sub-filling pattern and a spacer pattern disposed in a stack; the first sub-filling pattern is formed between two adjacent color filter regions, and the spacer pattern covers the first sub-filling pattern; at least the spacer pattern is subjected to a blackening process so that the filling pattern is converted into an opaque pattern.

An embodiment of the present disclosure further provides a display device including the color film substrate according to any one of the above mentioned embodiments.

DETAILED DESCRIPTION OF THE DISCLOSURE

Figure 1:
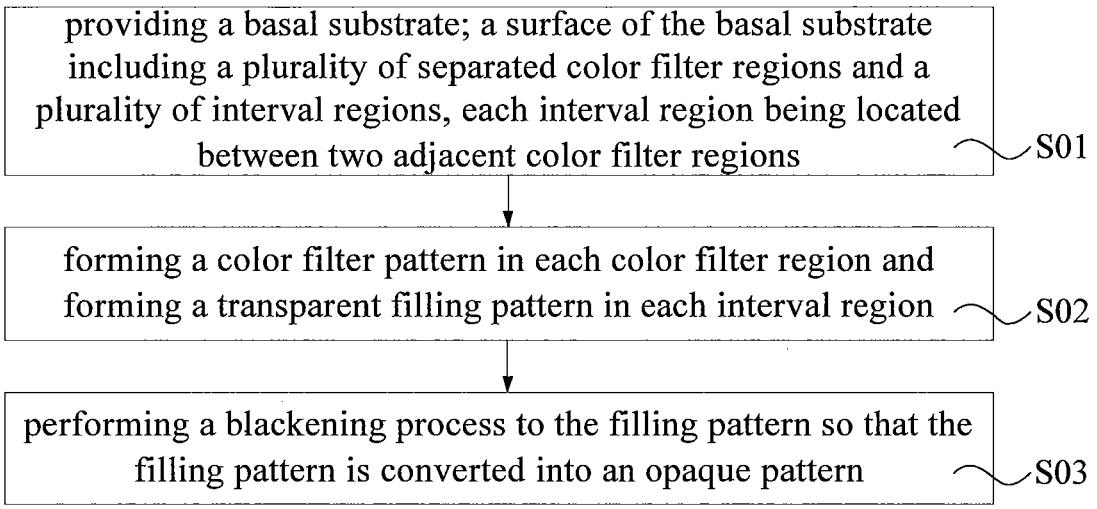
FIG. 1 is a flow chart of a method for manufacturing a color film substrate according to an embodiment of the present disclosure.

In the following, the technical solutions in embodiments of the disclosure will be described clearly and completely in connection with the drawings in the embodiments of the disclosure. Obviously, the described embodiments are only part of the embodiments of the disclosure, and not all of the embodiments. Based on the embodiments in the disclosure, all other embodiments obtained by those of ordinary skills in the art under the premise of not paying out creative work pertain to the protection scope of the disclosure.

It is to be noted that unless otherwise defined, all terms (including technical and scientific terms) used in the embodiments of the present disclosure have the same meaning as commonly understood by those skilled in the art to which this disclosure belongs. It should also be understood that terms such as those defined in the ordinary dictionary should be interpreted as having meanings consistent with their meaning in the context of the related art, and are not to be interpreted in terms of idealization or extreme formality unless explicitly stated herein.

For example, the terms "first", "second", and similar terms used in the specification and claims of the present disclosure do not denote any order, quantity, or importance, and are merely used to distinguish different components. The words "including" or "comprising", and the like, are intended to mean that the element(s) or item(s) preceding the word contains the element(s) or item(s) following the word and their equivalents. The terminology or positional relationship of "one side", "the other side", and the like, is based on the orientation or positional relationship shown in the drawings, and is merely for convenience of explanation of the technical solution of the present disclosure, rather than indicating or implying the device or component referred to must have a particular orientation, or be constructed and operated in a particular orientation, and thus should not be construed as limiting the present disclosure.

An embodiment of the present disclosure provides a method for manufacturing a color film substrate. As shown in FIG. 1, the method includes the following steps.

S01: providing a basal substrate; a surface of the basal substrate including a plurality of separated color filter regions and a plurality of interval regions, each interval region being located between two adjacent color filter regions.

S02: forming a color filter pattern in each color filter region and forming a transparent filling pattern in each interval region.

S03: performing a blackening process to the filling pattern so that the filling pattern is converted into an opaque pattern.

It should be noted that, firstly, in the embodiments of the present disclosure, the color and the arrangement manner of the color filter patterns are not limited, and the corresponding design of the color film substrate in the related art may be used. For example, the color filter pattern (red resin, red color filter; green resin, green color filter; blue resin, blue color filter) can be arranged in a strip shape, a mosaic shape, a triangle (delta) shape, etc., which will not be repeated in the embodiments of the present disclosure.

The interval region 1B on the substrate 1 is a vacant region on which a BM is formed originally in the related art.

In the context of the present disclosure, "opaque pattern" means that the pattern is capable of blocking light rays traveling in a direction perpendicular to the surface of the basal substrate. For example, in FIGS. 4, 6, 11-13, 16, 17, 19 and 20, the "opaque pattern" is indicated by a black pattern.

Secondly, in the related art, the BM material is usually composed of an opaque metal Cr, chromium oxide ($CrO_x$), black graphite, a resin to which a pigment and/or a dye is added, or the like; in the embodiments of the present disclosure, the material of the color filter pattern is typically a transparent material transmitting red light, green light, or blue light, which is obviously different from the BM material in the related art. By blackening the material of the color filter pattern and/or the transparent filling material, these transparent materials can be converted into a light-shielding material, thereby functioning as the BM material and isolating the color filters.

Here, the above mentioned "blackening process" means treating the material of the color filter pattern and/or the transparent filling material by a chemical means or the like, thereby converting the material into a light-shielding material.

Thirdly, the embodiments of the present disclosure do not limit the sequence of the step of blackening the filling material located in the interval region and the step of forming the color filter pattern in the color filter region. The step of blackening the filling material located in the interval region may be performed before or after the step of forming the color filter pattern in the color filter region.

For example, if the filling pattern includes a material of the color filter pattern, the material of the color filter pattern is processed by a one-time composition process. When a color filter pattern located in the color filter region is formed, the material of the color filter pattern may also be formed in the interval region; this portion of the material constitutes a filling pattern (or a portion of the filling pattern) in the interval region. In such a situation, the step of blackening the filling material located in the interval region is performed after the step of forming the color filter pattern and the filling pattern.

Moreover, when the filling pattern includes a transparent filling material, the transparent filling material may be a material that forms a protective layer and/or forms a spacer.

That is, after the step of forming the color filter pattern, the above mentioned manufacturing method may further include a step of forming a protective layer or a step of forming a protective layer and a spacer sequentially. Therefore, the transparent filling material may be a portion of the protective layer located in the interval region, or may be a portion of the protective layer located in the interval region and a spacer disposed in this region. Hence, the production cost can be saved, and the color filter (CF) manufacturing process can be further simplified.

Based on this, in the method for manufacturing the color film substrate provided by the embodiment of the present disclosure, by blackening the material of the color filter pattern and/or the transparent filling material formed in the interval region, the material of the color filter pattern and/or the transparent filling material is converted into an opaque material, thus the optical crosstalk of the adjacent color filters is avoided. Since the process for preparing a BM is removed from the conventional manufacturing process of the color film substrate, the problem caused by peeling off the BM in the color film substrate can be effectively solved, and the product yield rate is improved.

Further, the step of performing a blackening process may include: applying a mask for proper occlusion, and performing any one of laser burning, ultraviolet exposure, carbonization treatment and ion doping to the filling pattern to make the filling pattern opaque. A transparent region of the mask exposes the filling pattern, and an opaque region of the mask shields the color filter pattern.

Laser burning refers to the use of high energy of the laser to heat the material of the color filter pattern and/or the transparent filling material to cause cauterization, and then the material is converted into an opaque shading material.

Ultraviolet exposure refers to a series of chemical reactions between the photoinitiator in the material of the color filter pattern and/or the transparent filling material and the host material of the material of the color filter pattern and/or the transparent filling material by ultraviolet light irradiation. Therefore the material of the color filter pattern and/or the transparent filling material as a whole exhibit an opaque effect. In this case, a photoinitiator is included in the material of the color filter pattern and/or the transparent filling material.

The carbonization treatment refers to the high temperature treatment for organic materials containing carbon chains to make them opaque. Since the material of the color filter pattern is usually an organic material, the treatment method can be applied to the material of the color filter pattern. The carbonization treatment can also be applied to the transparent filling material if the transparent filling material is specifically an organic transparent filling material.

The ion doping treatment refers to doping the material of the color filter pattern and/or the transparent filling material, and changing it into a light-shielding material by changing the composition of the material. Exemplarily, the material of the color filter pattern and/or the transparent filling material may be subjected to hydrogen plasma treatment by using a plasma chemical vapor deposition or a plasma source to convert it into a light-shielding material.

Five examples are provided below for describing in detail the above manufacturing methods.

Figure 2:
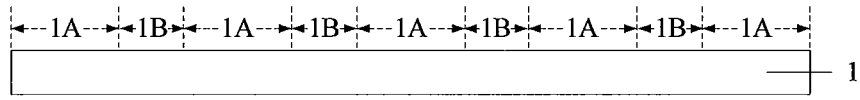
FIG. 2 is a structural schematic diagram of a basal substrate in a color film substrate according to an embodiment of the present disclosure.

An embodiment of the present disclosure provides a basal substrate 1 as shown in FIG. 2. A surface of the basal substrate 1 includes a plurality of separated color filter regions 1A and a plurality of interval regions 1B. Each interval region 1B is located between two adjacent color filter regions 1A. This embodiment provides a method for manufacturing a color filter substrate, which includes, but is not limited to, the following steps.

Figure 3:
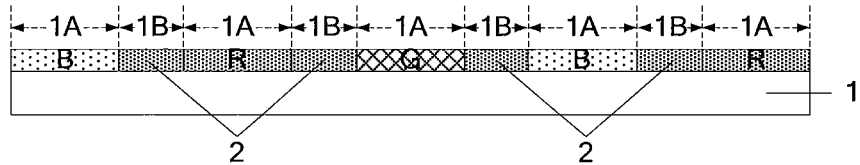
FIG. 3 is a structural schematic diagram of a color film substrate according to an embodiment of the present disclosure.
Figure 4:
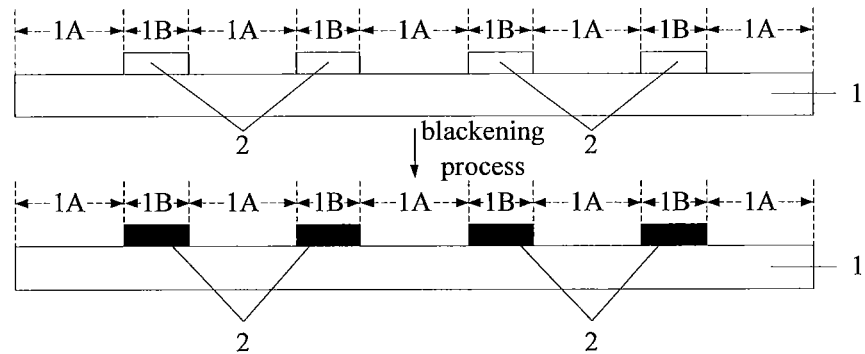
FIG. 4 is a structural schematic diagram of a color film substrate according to another embodiment of the present disclosure.

Step S11, as shown in FIG. 3 or FIG. 4, a color filter pattern (indicated with R, G or B) is formed in each color filter region 1A, and a transparent filling pattern 2 having a predetermined thickness is formed in each interval region 1B. The filling pattern 2 is composed of a material of the color filter pattern or a transparent filling material.

Figure 5:
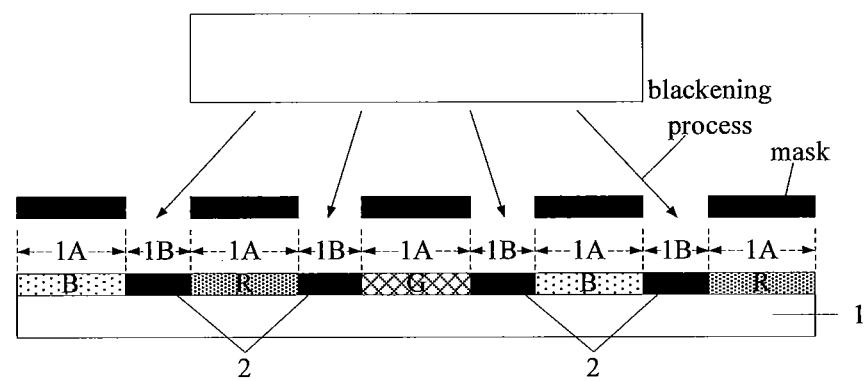
FIG. 5 is a structural schematic diagram of a color film substrate according to yet another embodiment of the present disclosure.
Figure 6:
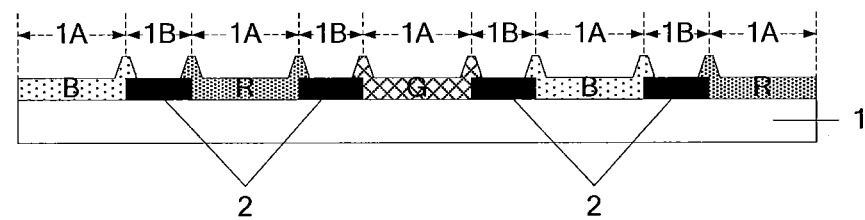
FIG. 6 is a structural schematic diagram of a color film substrate according to still another embodiment of the present disclosure.

Step S12, as shown in FIG. 5 or FIG. 6, a blackening process is performed to the filling pattern 2 so that the filling pattern 2 is converted into an opaque pattern.

It is to be noted that, firstly, the filling pattern 2 has a predetermined thickness, which is specifically the thickness of the BM in the color film substrate substantially having the same size in the related art, so that the thickness of the color film substrate formed in the embodiment is same to the thickness of the color film substrate including the BM in the related art, and meets the specific application requirements of the product.

Secondly, referring to FIG. 3, when the filling pattern 2 is composed of the material of the color filter pattern, the step of forming the color filter pattern in the color filter region 1A and the step of forming the filling pattern having the predetermined thickness in the interval region 1B can be performed in the same composition process. The color filter material for forming the filling pattern 2 may be any one of red/green/blue color filter materials (e.g., R/G/B resin).

That is, when a color filter pattern of a certain color such as red/green/blue is formed, the color filter material of this color is also retained in the interval region 1B to form the filling pattern 2. For example, the material of the R color filter may be applied to the interval region 1B at the time of coating the R color filter, and then the G/B filter may be coated.

After that, referring to FIG. 5, with occlusion of a mask, the filling pattern 2 can be blackened and converted into an opaque pattern, which functions as a BM in the related art.

Thirdly, referring to FIG. 4, when the filling pattern 2 is formed of a transparent filling material, the filling pattern 2 may be formed first. Thereafter, with occlusion of a mask, the filling pattern 2 can be blackened and converted into an opaque pattern, which functions as a BM in the related art. Then, referring to FIG. 6, the R/G/B color filter pattern can be formed. Moreover, in order to prevent light leakage, both ends of the R/G/B color filter pattern may overlap the filling pattern 2.

Another embodiment of the present disclosure provides a basal substrate 1 as shown in FIG. 2. A surface of the basal substrate 1 includes a plurality of separated color filter regions 1A and a plurality of interval regions 1B. Each interval region 1B is located between two adjacent color filter regions 1A. This embodiment provides a method for manufacturing a color filter substrate, which includes, but is not limited to, the following steps.

Figure 7:
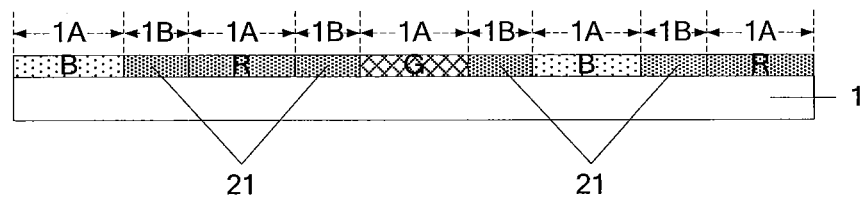
FIG. 7 is a structural schematic diagram of a color film substrate according to another embodiment of the present disclosure.
Figure 8:
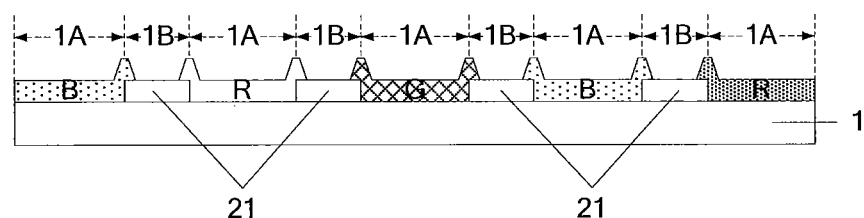
FIG. 8 is a structural schematic diagram of a color film substrate according to another embodiment of the present disclosure.

Step S21, as shown in FIG. 7 or FIG. 8, a color filter pattern (indicated with R, G or B) is formed in each color filter region 1A, and a first sub-filling pattern 21 having a predetermined thickness is formed in each interval region 1B. The first sub-filling pattern 21 is composed of a material of the color filter pattern or a transparent filling material.

Figure 9:
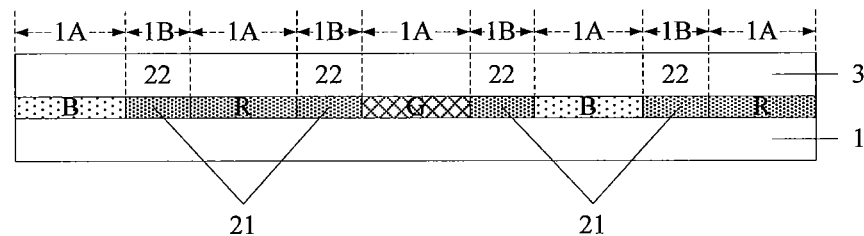
FIG. 9 is a structural schematic diagram of a color film substrate according to another embodiment of the present disclosure.
Figure 10:
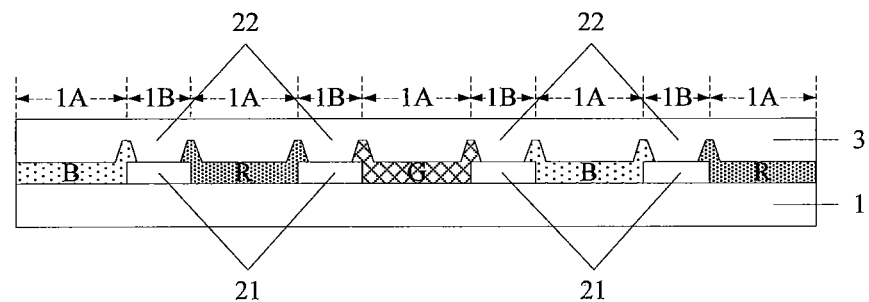
FIG. 10 is a structural schematic diagram of a color film substrate according to another embodiment of the present disclosure.

Step 22, as shown in FIG. 9 or FIG. 10, a protective layer 3 (e.g., over coat, OC) covering the color filter pattern and the first sub-filling pattern 21 is formed. A portion of the protective layer 3 covering the first sub-filling pattern 21 is the second sub-filling pattern 22. The protective layer 3 is composed of a transparent filling material.

Figure 11:
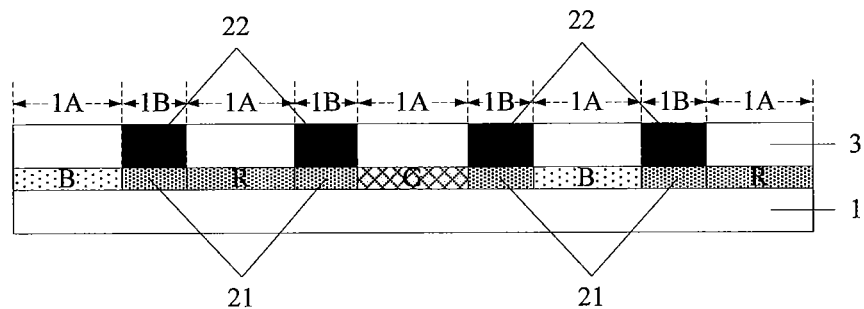
FIG. 11 is a structural schematic diagram of a color film substrate according to another embodiment of the present disclosure.
Figure 12:
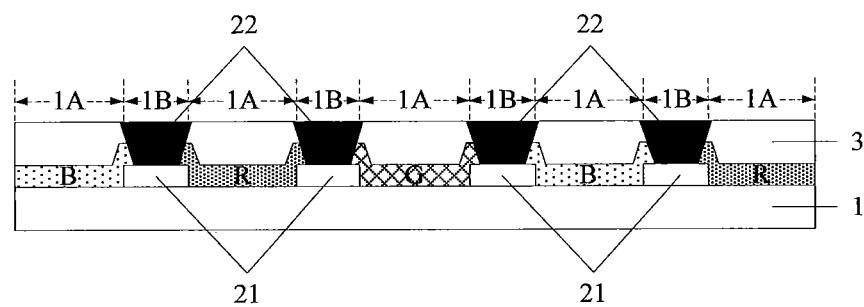
FIG. 12 is a structural schematic diagram of a color film substrate according to another embodiment of the present disclosure.

Step 23, as shown in FIG. 11 or FIG. 12, a blackening process is performed to the second sub-filling pattern 22 so that the filling pattern is converted into an opaque pattern.

It is to be noted that, firstly, the above mentioned filling pattern 2 includes the first sub-filling patterns 21 and the second sub-filling patterns 22 which are arranged in a stack.

Secondly, in the above mentioned step S21, the structure in which the first sub-filling pattern 21 is composed of the material of the color filter pattern or the transparent filling material can be referred to the foregoing embodiment, which is not described in this embodiment.

Figure 13:
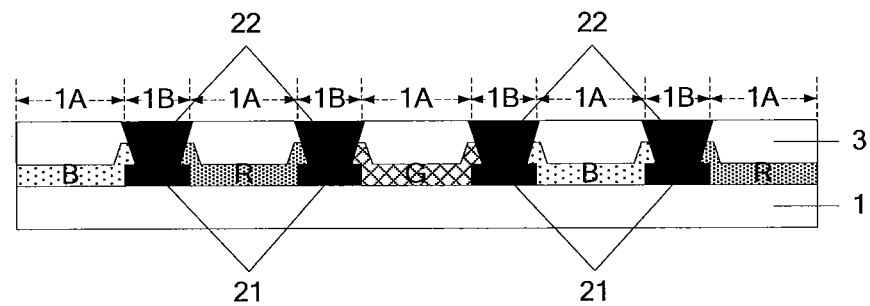
FIG. 13 is a structural schematic diagram of a color film substrate according to another embodiment of the present disclosure.

Thirdly, the embodiment may further include a step of performing a blackening process to the previously formed first sub-filling pattern 21 to form a structure as shown in FIG. 13, thereby further enhancing the shading effect. The specific steps can refer to the foregoing description, which is not described in this embodiment.

Another embodiment of the present disclosure provides a basal substrate 1 as shown in FIG. 2. A surface of the basal substrate 1 includes a plurality of separated color filter regions 1A and a plurality of interval regions 1B. Each interval region 1B is located between two adjacent color filter regions 1A. This embodiment provides a method for manufacturing a color filter substrate, which includes, but is not limited to, the following steps.

Step S31, as shown in FIG. 7 or FIG. 8, a color filter pattern is formed (indicated with R, G or B) in each color filter region, forming a first sub-filling pattern having a predetermined thickness in each interval region; the first sub-filling pattern is composed of a material of the color filter pattern or a transparent filling material.

Step S32, as shown in FIG. 9 or FIG. 10, a protective layer 3 covering the color filter pattern and the first sub-filling pattern 21 is formed. A portion of the protective layer 3 covering the first sub-filling pattern 21 is the second sub-filling pattern 22. The protective layer 3 is composed of a transparent filling material.

Figure 14:
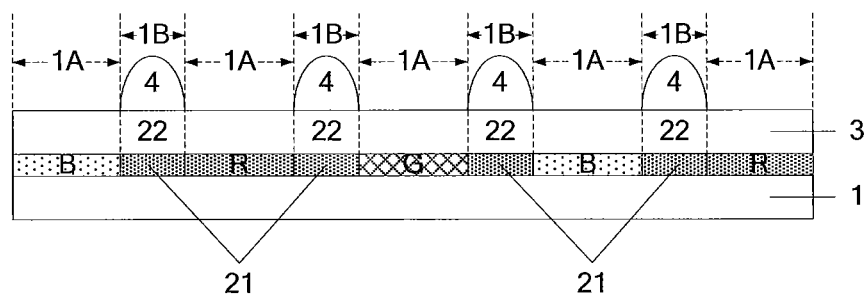
FIG. 14 is a structural schematic diagram of a color film substrate according to another embodiment of the present disclosure.
Figure 15:
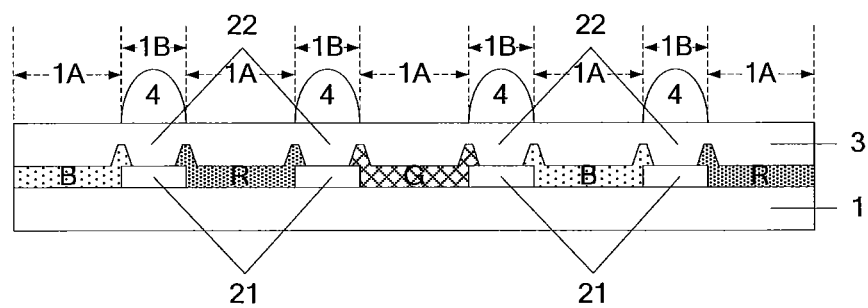
FIG. 15 is a structural schematic diagram of a color film substrate according to another embodiment of the present disclosure.

Step S33, as shown in FIG. 14 or FIG. 15, a spacer pattern 4 if formed on the second sub-filling pattern 22. The spacer pattern 4 is composed of a transparent filling material.

Figure 16:
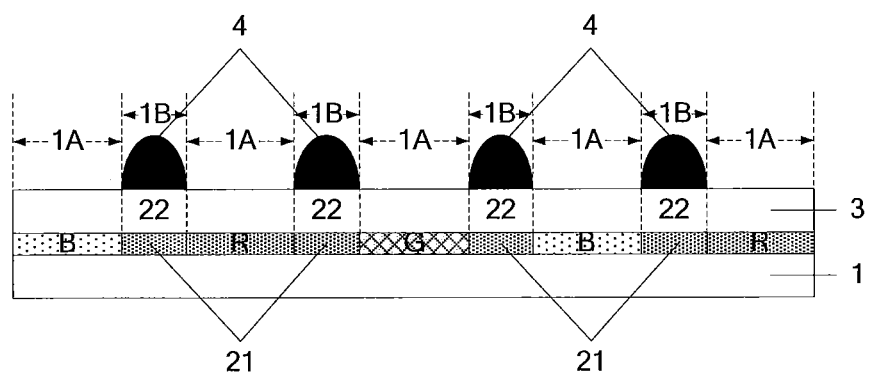
FIG. 16 is a structural schematic diagram of a color film substrate according to another embodiment of the present disclosure.
Figure 17:
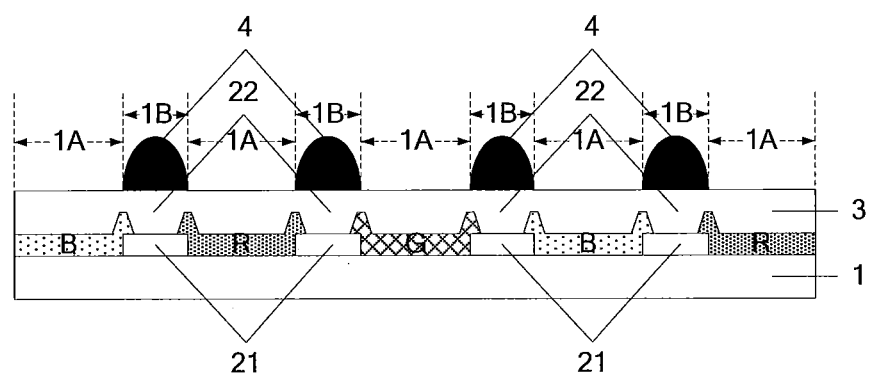
FIG. 17 is a structural schematic diagram of a color film substrate according to another embodiment of the present disclosure.

Step S34, as shown in FIG. 16 or FIG. 17, a blackening process is performed to the spacer pattern 4 so that the filling pattern is converted into an opaque pattern.

It is to be noted that, firstly, the filling pattern 2 includes the first sub-filling pattern 21, the second sub-filling pattern 22 and the spacer pattern 4 disposed in a stack.

Secondly, the cross-sectional shape of the spacer pattern 4 (or, a post spacer, abbreviated as PS) may be a long column shape covering the second sub-filling pattern 22 the R/G/B color filter patterns. The spacer pattern 4 can increase the support strength between the color film substrate and the array substrate while exhibiting a shading effect of the BM in the related art. The specific manufacturing process of the spacer pattern may follow the related art, and the details are not described in this embodiment.

In addition, the embodiment may further include a step of blackening the second sub-filling pattern 22 and/or the first sub-filling pattern 21 under the spacer pattern 4 to further enhance the shading effect.

Another embodiment of the present disclosure provides a basal substrate 1 as shown in FIG. 2. A surface of the basal substrate 1 includes a plurality of separated color filter regions 1A and a plurality of interval regions 1B. Each interval region 1B is located between two adjacent color filter regions 1A. This embodiment provides a method for manufacturing a color filter substrate, which includes, but is not limited to, the following steps.

Figure 18:
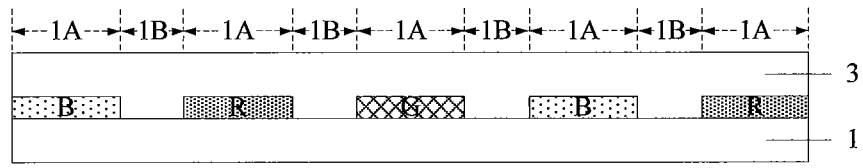
FIG. 18 is a structural schematic diagram of a color film substrate according to another embodiment of the present disclosure.

Step S41, as shown in FIG. 18, an R/G/B color filter pattern is formed in each color filter region 1A.

Step S42, as shown in FIG. 18, a protective layer 3 covering the R/G/B color filter pattern and the interval region 1B is formed. A portion of the protective layer 3 covering the interval region 1B is the filling pattern. The protective layer 3 is composed of a transparent filling material.

Figure 19:
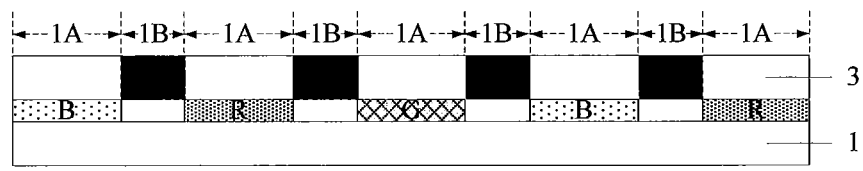
FIG. 19 is a structural schematic diagram of a color film substrate according to another embodiment of the present disclosure.

Step S43, as shown in FIG. 19, a blackening process is performed to the filling pattern so that the filling pattern is converted into an opaque pattern.

That is, the filling pattern is a portion of the protective layer covering the interval region 1B. The specific structure of the protective layer can refer to the foregoing embodiment, which is not described in this embodiment.

Here, compared with the above embodiment, this embodiment directly adopts a portion of the protective layer as the filling pattern, and the structure is simpler and easier to implement.

Another embodiment of the present disclosure provides a basal substrate 1 as shown in FIG. 2. A surface of the basal substrate 1 includes a plurality of separated color filter regions 1A and a plurality of interval regions 1B. Each interval region 1B is located between two adjacent color filter regions 1A. This embodiment provides a method for manufacturing a color filter substrate, which includes, but is not limited to, the following steps.

Figure 20:
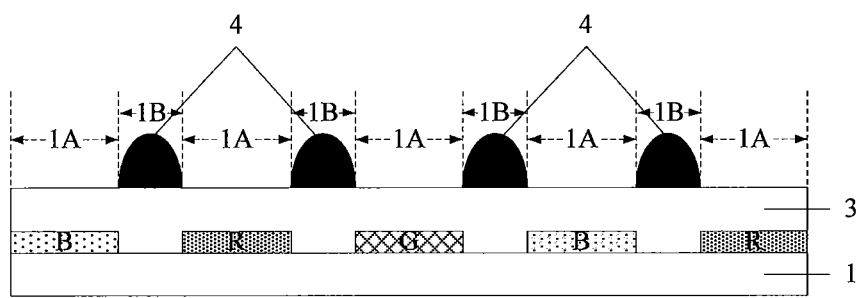
FIG. 20 is a structural schematic diagram of a color film substrate according to another embodiment of the present disclosure.

Step S51, as shown in FIG. 20, an R/G/B color filter pattern is formed in each color filter region.4

Step S52, as shown in FIG. 20, a protective layer 3 covering the R/G/B color filter pattern and the interval region 1B is formed. A portion of the protective layer 3 covering the interval region 1B is the first sub-filling pattern.

Step S53, as shown in FIG. 20, a spacer pattern 4 is formed on the first sub-filling pattern. The spacer pattern 4 is composed of a transparent filling material.

Step S54, as shown in FIG. 20, a blackening process is performed to the spacer pattern 4 so that the filling pattern is converted into an opaque pattern.

The above mentioned filling pattern 2 includes the first sub-filling pattern and the spacer pattern which are arranged in a stack. The specific structure of the filling pattern can refer to the foregoing embodiments, and details are not described herein.

Here, compared with the above mentioned several embodiments, the filling pattern in this embodiment includes a portion of the protective layer and a spacer pattern disposed on the region originally belonging to the BM. The structure is relatively simple and easy to implement.

Based on this, an embodiment of the present disclosure further provides a color film substrate. The color film substrate includes: a basal substrate; a surface of the basal substrate including a plurality of separated color filter regions and a plurality of interval regions, each interval region being located between two adjacent color filter regions; a color filter pattern formed in each color filter region and a transparent filling pattern formed in each interval region; the filling pattern being composed of a material of the color filter pattern and/or a transparent filling material; the filling pattern is subjected to a blackening process so that the filling pattern is converted into an opaque pattern.

In some embodiments, the filling pattern includes a first sub-filling pattern and a spacer pattern disposed in a stack; the first sub-filling pattern is formed between two adjacent color filter regions, and the spacer pattern covers the first sub-filling pattern; at least the spacer pattern is subjected to a blackening process so that the filling pattern is converted into an opaque pattern.

The material of the protective layer (OC) may specifically include: a base material (such as an epoxy resin and a PI-type polymer (e.g., alicyclic polyimide)), a (carboxyl) curing agent added to the base material, and additives such as a surface active agent.

The material of the spacer pattern may specifically be propylene glycol monomethyl ether acetate (PGMEA) or bis(2-methoxy ethyl)ether (DG).

Based on this, an embodiment of the present disclosure further provides a display device including the color film substrate according to any one of the above mentioned embodiments. The display device may specifically be a product or a component with display function, such as a liquid crystal display, a liquid crystal television, an organic electroluminescence display, an organic electroluminescence television, a digital photo frame, a mobile phone, a tablet computer, a digital photo frame, and a navigator.

According to the method of manufacturing a color film substrate, by blackening the material of the color filter pattern and/or the transparent filling material formed in the interval region, the material of the color filter pattern and/or the transparent filling material is converted into an opaque material, thus the optical crosstalk of the adjacent color filters is avoided. Since the process for preparing a BM is removed from the conventional manufacturing process of the color film substrate, the problem caused by peeling off the BM in the color film substrate can be effectively solved, and the product yield rate is improved.

The above embodiments are only used for explanations rather than limitations to the present disclosure, the ordinary skilled person in the related technical field, in the case of not departing from the spirit and scope of the present disclosure, may also make various modifications and variations, therefore, all the equivalent solutions also belong to the scope of the present disclosure, the patent protection scope of the present disclosure should be defined by the claims.

What is claimed is:
1. A method for manufacturing a color film substrate, comprising:
   providing a basal substrate, wherein a surface of the basal substrate comprises a plurality of color filter regions that are separated from one another and a plurality of interval regions, and wherein each interval region of the plurality of interval regions is between adjacent color filter regions;
   forming a color filter pattern in each of the color filter regions;
   forming a filling pattern that is transparent in each interval region of the plurality of interval regions; and
   performing a blackening process on the filling pattern so that the filling pattern is converted into an opaque pattern,
   wherein the filling pattern comprises a first sub-filling pattern, a second sub-filling pattern and a spacer pattern in a stack, the method further comprising:
   forming a protective layer on the color filter pattern and the first sub-filling pattern;
   forming the spacer pattern on the second sub-filling pattern,
   wherein the forming the filling pattern comprises forming a first sub-filling pattern having a predetermined thickness in each interval region of the plurality of interval regions, wherein the first sub-filling pattern comprises a material of the color filter pattern or a transparent filling material, wherein a portion of the protective layer on the first sub-filling pattern comprises the second sub-filling pattern, wherein the protective layer comprises the transparent filling material, wherein the spacer pattern comprises the transparent filling material, and wherein the performing the blackening process comprises performing the blackening process on the spacer pattern so that the filling pattern is converted into the opaque pattern.

2. The method according to claim 1, wherein the performing the blackening process on the filling pattern so that the filling pattern is converted into the opaque pattern comprises:

applying a mask and performing at least one of laser burning, ultraviolet exposure, carbonization treatment or ion doping on the filling pattern to make the filling pattern opaque, wherein a transparent region of the mask exposes the filling pattern, and an opaque region of the mask shields the color filter pattern.

3. The method according to claim 1, wherein the forming the filling pattern that is transparent in each interval region comprises:

forming the filling pattern having a predetermined thickness in each interval region, wherein the filling pattern comprises a material of the color filter pattern or a transparent filling material.

4. A method for manufacturing a color film substrate, comprising:

providing a basal substrate, wherein a surface of the basal substrate comprises a plurality of color filter regions that are separated from one another and a plurality of interval regions, and wherein each interval region of the plurality of interval regions is between adjacent color filter regions;

forming a color filter pattern in each of the color filter regions;

forming a filling pattern that is transparent in each interval region of the plurality of interval regions; and performing a blackening process on the filling pattern so that the filling pattern is converted into an opaque pattern, wherein the filling pattern comprises a first sub-filling pattern and a spacer pattern in a stack, the method further comprising:

forming a protective layer on the color filter pattern and the interval region, wherein a portion of the protective layer on the interval region comprises the first sub-filling pattern; and forming a spacer pattern on the first sub-filling pattern, wherein the spacer pattern comprises a transparent filling material, wherein the performing the blackening process comprises performing the blackening process on the spacer pattern so that the filling pattern is converted into the opaque pattern.

5. The method according to claim 4, wherein the performing the blackening process on the spacer pattern so that the filling pattern is converted into the opaque pattern comprises:

applying a mask; and performing at least one of laser burning, ultraviolet exposure, carbonization treatment or ion doping to the spacer pattern to make the filling pattern opaque, wherein a transparent region of the mask exposes the spacer pattern, and wherein an opaque region of the mask shields the color filter pattern.

* * * * *